United States Patent
Xiang

(10) Patent No.: US 9,877,519 B2
(45) Date of Patent: Jan. 30, 2018

(54) ELECTRONIC CIGARETTE

(71) Applicant: HUIZHOU KIMREE TECHNOLOGY CO., LTD, Huizhou, Guangdong (CN)

(72) Inventor: Zhiyong Xiang, Guangdong (CN)

(73) Assignee: HUIZHOU KIMREE TECHNOLOGY CO., LTD. SHENZHEN BRANCH, Shenzhen, Guangdong (CN)

(*) Notice: Subject to any disclaimer, the term of this patent is extended or adjusted under 35 U.S.C. 154(b) by 37 days.

(21) Appl. No.: 15/134,382

(22) Filed: Apr. 21, 2016

(65) Prior Publication Data

US 2016/0227842 A1    Aug. 11, 2016

Related U.S. Application Data

(63) Continuation of application No. PCT/CN2014/083888, filed on Aug. 7, 2014.

(51) Int. Cl.
*A24F 47/00* (2006.01)
*G05B 15/02* (2006.01)
(Continued)

(52) U.S. Cl.
CPC ............ *A24F 47/008* (2013.01); *G05B 15/02* (2013.01); *G08B 5/22* (2013.01); *H04W 76/023* (2013.01)

(58) Field of Classification Search
CPC .................................................. A24F 47/008
See application file for complete search history.

(56) References Cited

U.S. PATENT DOCUMENTS 3,852,732 A * 12/1974 Yorksie ............ G01R 19/16542
                                                                320/136
5,485,361 A *  1/1996 Sokal ................ H02M 3/33507
                                                                315/241 P
(Continued)

FOREIGN PATENT DOCUMENTS

CN      202890466 U      4/2013
CN      203262287        11/2013
(Continued)

OTHER PUBLICATIONS

International Search Report for PCT/CN2014/083888, dated May 6, 2015, ISA/CN.

*Primary Examiner* — James Harvey
(74) *Attorney, Agent, or Firm* — U.S. Fairsky LLP; Yue Xu

(57) ABSTRACT

An electronic cigarette including an electronic cigarette body is provided. The electronic cigarette body is provided with an atomizer assembly configured to atomize nicotine liquid and a battery assembly configured to power the electronic cigarette body. A communication assembly is disposed between the atomizer assembly and the battery assembly and is provided with a first connecting end detachably connected to the battery assembly, a second connecting end detachably connected to the atomizer assembly, and a conductive module configured to connect the battery assembly to the atomizer assembly. The communication assembly is further provided with a microcontroller configured to record smoking information of the electronic cigarette according to an electrical signal of the conductive module and control operation of modules of the communication assembly, and a wireless communication module configured to establish communication connection with the external terminal.

18 Claims, 6 Drawing Sheets

(51) Int. Cl.
    *G08B 5/22*         (2006.01)
    *H04W 76/02*     (2009.01)

(56) References Cited

U.S. PATENT DOCUMENTS

| | | | |
|---|---|---|---|
| 2013/0255702 A1* | 10/2013 | Griffith, Jr. | A24F 47/008 131/328 |
| 2014/0020697 A1 | 1/2014 | Liu | |
| 2014/0157583 A1* | 6/2014 | Ward | H05B 3/00 29/611 |
| 2014/0261495 A1* | 9/2014 | Novak | A24F 47/008 131/329 |
| 2015/0223522 A1* | 8/2015 | Ampolini | A24F 47/008 131/328 |
| 2015/0313283 A1* | 11/2015 | Collett | A24F 47/008 131/328 |
| 2016/0227842 A1* | 8/2016 | Xiang | A24F 47/008 |
| 2016/0278435 A1* | 9/2016 | Choukroun | A24F 47/008 |
| 2016/0371437 A1* | 12/2016 | Alarcon | G06Q 50/24 |
| 2016/0374392 A1* | 12/2016 | Liu | H02J 7/0052 392/404 |
| 2017/0027231 A1* | 2/2017 | Xiang | A24F 47/008 |
| 2017/0156401 A1* | 6/2017 | Liu | A24F 47/008 |

FOREIGN PATENT DOCUMENTS

| | | |
|---|---|---|
| CN | 103653261 A | 3/2014 |
| CN | 203709255 U | 7/2014 |

* cited by examiner

ELECTRONIC CIGARETTE

CROSS-REFERENCE TO RELATED APPLICATION

This application is a continuation application of International Application PCT/CN2014/083888, titled "ELECTRONIC CIGARETTE", and filed on Aug. 7, 2014, which is incorporated herein by reference in its entirety.

FIELD

The disclosure relates to the field of electronic cigarettes, in particular to electronic cigarettes with wireless communication function.

BACKGROUND

With improvement of health consciousness, more and more people realize the harm of smoking, therefore electronic cigarettes healthier than cigarettes are welcome.

Most of conventional electronic cigarettes are independent individuals without an independent wireless transmission module (connector), thereby they can not communicate with a terminal. Thus, the electronic cigarette can not perform interactive communication with other terminals, and can not receive transmission data. Some electronic cigarettes may communicate with an electronic cigarette case, and transmit smoking-related data of a user to the electronic cigarette case, which needs the electronic cigarette to be connected to the electronic cigarette case to transmit data. The user needs to carry the electronic cigarette case when using the electronic cigarette, which is very inconvenient.

SUMMARY

In view of the foregoing issues, an electronic cigarette with wireless communication function is provided according to the disclosure, including an electronic cigarette body.

The electronic cigarette body is provided with an atomizer assembly configured to atomize nicotine liquid and a battery assembly configured to power elements of the electronic cigarette body. The electronic cigarette further includes a communication assembly, which is disposed between the atomizer assembly and the battery assembly, and is configured to communicate with an external terminal.

The communication assembly is provided with a first connecting end detachably connected to the battery assembly, a second connecting end detachably connected to the atomizer assembly, and a conductive module configured to connect the battery assembly to the atomizer assembly, so that the battery assembly may power the atomizer assembly.

The communication assembly is further provided with a microcontroller, which is electrically connected to the conductive module, and is configured to record smoking information of the electronic cigarette according to the electrical signal of the conductive module and control operation of modules of the communication assembly, and a wireless communication module, which is electrically connected to the microcontroller and configured to establish communication connection with the external terminal to communicate data.

Optionally, the battery assembly is provided with a third connecting end detachably connected to the first connecting end, and the atomizer assembly is provided with a fourth connecting end detachably connected to the second connecting end, where the third connecting end is capable of being detachably connected to the fourth connecting end to form the electronic cigarette body.

Optionally, an airflow channel is disposed inside the atomizer assembly, battery assembly and the communication assembly, and the airflow channel passing through the atomizer assembly, the battery assembly and the communication assembly is configured for air circulation when smoking.

An airflow sensor and a control module are disposed in the airflow channel inside the battery assembly.

The airflow sensor is configured to sense pressure change in the airflow channel, and transmit smoking signal to the control module according to the pressure change in the airflow channel inside the battery assembly.

The control module is configured to control the battery assembly to power the atomizer assembly according to the smoking signal transmitted by the airflow sensor.

Optionally, the atomizer assembly, the communication assembly and the battery assembly are coaxially disposed.

Optionally, the communication assembly is provided with a power battery, and the power battery is configured to power elements of the communication assembly.

Optionally, when a user puffs on the electronic cigarette, the battery assembly powers the atomizer assembly through the conductive module to atomize tobacco tar, while the battery assembly powers the elements of the communication assembly through the conductive module.

Optionally, the communication assembly is further provided with an energy-storage capacitor module.

The energy-storage capacitor module is electrically connected to the conductive module. When the user puffs on the electronic cigarette, the battery assembly powers the atomizer assembly through the conductive module to atomize tobacco tar, while the battery assembly powers the energy-storage capacitor module through the conductive module, and when the battery assembly stops powering the communication assembly, the energy-storage capacitor module powers the elements of the communication assembly.

Optionally, the communication assembly is further provided with a rechargeable battery.

The rechargeable battery is electrically connected to the conductive module, so that when the user puffs on the electronic cigarette, the battery assembly powers the atomizer assembly through the conductive module to atomize tobacco tar, while the battery assembly powers the rechargeable battery through the conductive module.

The rechargeable battery is configured to power the elements of the communication assembly, when the battery assembly stops powering the elements of the communication assembly.

Optionally, the communication assembly is further provided with a diode protection module.

The diode protection module is disposed between a positive electrode of the rechargeable battery and the conductive module.

The diode protection module includes a resistor and a first diode, and the resistor is connected to the first diode in parallel.

The diode protection module is electrically connected to the positive electrode of the battery. When the rechargeable battery powers the communication assembly, the first diode is turned on, thereby preventing reverse current from burning the rechargeable battery, and when powering the communication assembly, the battery assembly charges the rechargeable battery through the resistor.

Optionally, the microcontroller is provided with a timing unit and a counting unit.

The timing unit is configured to record duration the user smokes, and store the duration into the storage unit.

The counting unit is configured to record number of times the user smokes, and store the number into the storage unit.

Optionally, the third connecting end of the battery assembly is provided with a positive electrode connecting end and a negative electrode connecting end.

The fourth connecting end of the atomizer assembly is provided with an outer electrode and an inner electrode, which are configured for power connection of the atomizer assembly.

The first connecting end and the second connecting end of the conductive module are provided with a first conductive end and a second conductive end.

The first conductive end is electrically connected to the positive electrode connecting end and the outer electrode, the second conductive end is electrically connected to the negative electrode connecting end and the inner electrode, so that the positive electrode connecting end is connected to the outer electrode through the first conductive end, and the negative electrode connecting end is connected to the inner electrode through the second conductive end, therefore the battery assembly may power the atomizer assembly.

Optionally, the communication assembly is further provided with a switch module.

The switch module is configured to control to turn on or turn off the communication assembly.

Optionally, the wireless communication module supports bluetooth or wireless fidelity (WIFI) communication.

Optionally, the communication assembly is further provided with a display module.

The display module is configured to display operation status of the communication assembly.

Optionally, the communication assembly is detachably connected to the battery assembly and the atomizer assembly respectively.

The detachable connection includes threaded connection, snap-fit connection or magnet adhesion.

Optionally, the electronic cigarette body is further provided with an oil storage assembly connected to the atomizer assembly.

The oil storage assembly is configured to store nicotine liquid.

A system for collecting smoking information, including the electronic cigarette and a terminal.

The electronic cigarette is configured to collect smoking information of a user and transmit the smoking information to the terminal.

The terminal is configured to feed back the smoking information to the user.

Optionally, the terminal includes a cellphone, a tablet computer or a desktop computer.

It is can be seen from above technical solutions that the disclosure has following advantages.

The electronic cigarette is provided with a communication assembly, the communication assembly acquires smoking information of a user through a microcontroller, a wireless communication module transmits the smoking information to a terminal, and the user gets to know the smoking information of the user through the terminal. The smoking information herein may include smoking duration, puff number and number of times of smoking etc. In this case, the user grasps the smoking information, and may adjust smoking habits according to status of the user, so that the user keeps a good physical state. Meanwhile, the user is also more interested in puffing on the electronic cigarette, during which the user has an experience differing from puffing on a normal cigarette. The communication assembly is detachably connected to the battery assembly and the atomizer assembly respectively. The detachable structure design is beneficial for assembly and disassembly for the communication assembly. If the user needs communication, the communication assembly may be assembled between the battery assembly and the atomizer assembly, and may be disassembled when not needed, thereby not affecting normal use of the electronic cigarette. When needing replacing the electronic cigarette, the user may disassemble the communication assembly, and assemble the communication assembly on another electronic cigarette with a same connecting way. In this way, it is avoided that smoking information is leaked when the user discard the electronic cigarette with the communication assembly, thereby avoiding leakage of personal smoking status and smoking state data, and well protecting personal privacy. It can be said the structure is simple and ingenious, and has high reliability and good portability.

BRIEF DESCRIPTION OF THE DRAWINGS

To describe the technical solutions for the embodiment of the present disclosure or technical solutions in conventional technology more clearly, the following briefly describes the drawings involved in the embodiments of the present disclosure or in the conventional technology. Apparently, the drawings described below are some embodiments, and persons of ordinary skill in the art can derive other drawings according to the drawings without any creative effort.

Figure 1:
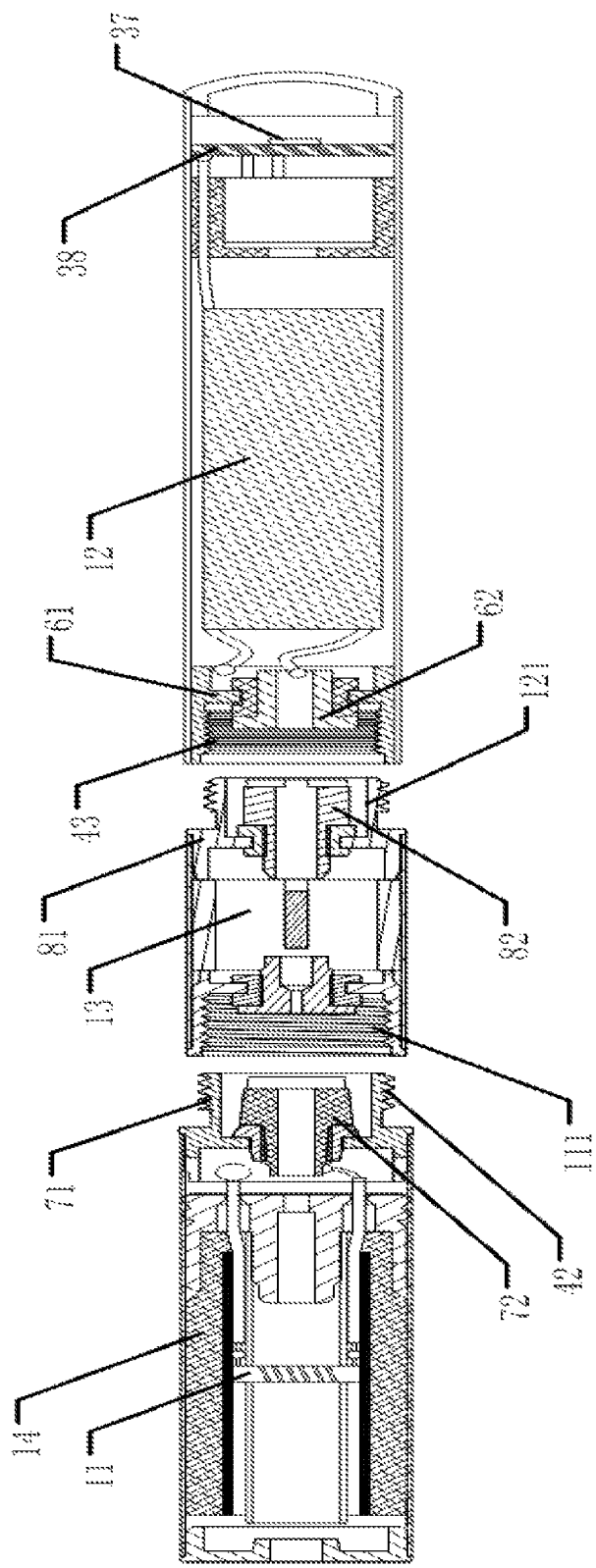
FIG. 1 is an overall structural diagram of an electronic cigarette provided according to the disclosure.

DESCRIPTION OF DRAWING SIGNS 11 atomizer assembly
12 battery assembly
13 communication assembly
14 oil storage assembly
21 wireless communication module
24 microcontroller
26 conductive module
31 power battery
32 switch module
36 display module
37 airflow sensor
38 control module
41 rechargeable battery
43 third connecting end
42 fourth connecting end
51 diode protection module
511 first diode
512 resistor
52 second diode 61 positive electrode connecting end
62 negative electrode connecting end
71 outer electrode
72 inner electrode
81 first conductive end
82 second conductive end

DETAILED DESCRIPTION OF THE
EMBODIMENTS

Figure 2:
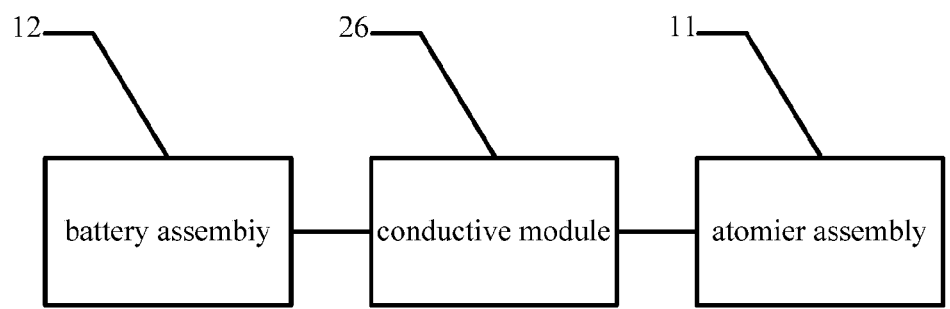
FIG. 2 is a schematic diagram for a battery assembly, a conductive module and an atomizer assembly of an electronic cigarette provided according to the disclosure.

Referring to FIG. 1 in conjunction with FIG. 2, an electronic cigarette with wireless communication function is provided according to the disclosure, including an electronic cigarette body.

The electronic cigarette body is disposed with an atomizer assembly 11 configured to atomize nicotine liquid and a battery assembly 12 configured to power elements inside the electronic cigarette body. The electronic cigarette further includes a communication assembly 13, which is disposed between the atomizer assembly 11 and the battery assembly 12, and configured to communicate with an external terminal.

The communication assembly 13 is further provided with a first connecting end 121 detachably connected to the battery assembly 12, a second connecting end 111 detachably connected to the atomizer assembly 11, and a conductive module 26 configured to connect the battery assembly 12 to the atomizer assembly 11, so that the battery assembly 12 may power the conductive module 26.

The communication assembly 13 is further provided with a microcontroller 24, which is electrically connected to the conductive module 26, and configured to record smoking information of the electronic cigarette according to electrical signals from the conductive module 26 and control operation of modules inside the communication assembly 13, and a wireless communication module 21, which is connected electrically to the microcontroller 24, and configured to establish communication connection to the external terminal and perform data transmission.

In view of this, it is can be seen that the microcontroller 24 is electrically connected to the conductive module 26, so that when a user puffs on the electronic cigarette, the microcontroller 24 acquires operation state of the electronic cigarette by detecting the level of the conductive module 26.

The communication assembly 13 acquires the smoking information of the user through the microcontroller 24, the wireless communication module 21 transmits the smoking information to the terminal, and thus the user gets to know his/her smoking information through the terminal. The smoking information herein may include smoking duration, puff number and smoking times, etc. In this case, the user may grasp his/her smoking information, and may adjust smoking habits according to his/her status, so that the user may keep a good physical state. Meanwhile, the user is also more interested in puffing on the electronic cigarette, during which the user has an experience differing from puffing on a normal cigarette. The communication assembly 13 is detachable connected to the battery assembly 12 and the atomizer assembly 11 respectively. The detachable structure design is beneficial for assembly and disassembly for the communication assembly. If the user needs communication, the communication assembly may be assembled between the battery assembly and the atomizer assembly, and the communication assembly may be disassembled when not needed, thereby not affecting normal use of the electronic cigarette. It is can be said the structure is simple and ingenious, and has high reliability and good portability.

According to an embodiment of the disclosure, referring to FIG. 1, the battery assembly 12 is provided with a third connecting end 43 detachably connected to the first connecting end 121, and the atomizer assembly 11 is provided with a fourth connecting end 42 detachably connected to the second connecting end 111, where the third connecting end 43 is capable of being detachably connected to the fourth connecting end 42 to form the electronic cigarette body.

In view of this, it is may be seen that the battery assembly 12 is detachably connected to the atomizer assembly 11 through the third connecting end 43 and the fourth connecting end 42 to form the electronic cigarette. In this case, smoking function of the electronic cigarette may be achieved without assembling the communication assembly 13. In the connection structure, the communication assembly 13 may be disassembled, and the battery assembly 12 and the atomizer assembly 11 form the electronic cigarette, therefore the electronic cigarette will not transmit smoking information of the user to the outside world, leakage for data of personal smoking status and physical state is better avoided and personal privacy is well protected.

In a case that the user wants to discard an electronic cigarette, the user may disassemble the communication assembly 13 and assemble the communication assembly 13 to another electronic cigarette with the same connection way. In this case, the smoking information of the user is prevented to be leaked when the user discards the electronic cigarette equipped with the communication assembly 13. Ordinarily, when the user wants to use an electronic cigarette with communication function, the user may connect the communication assembly 13 to an electronic cigarette with the same connection way. Therefore it does not require each electronic cigarette is provided with the communication assembly 13. Thus the cost for buying the electronic cigarette is saved, and the electronic cigarette is easy to be replaced and is portable. The detachable connection structure of the communication assembly 13 is beneficial for the user to select a period of time to record smoking status of the user, the user may arbitrarily select to record or not, thereby improving user experience.

The communication assembly 13 is detachably disposed between the battery assembly 12 and the atomizer assembly 11, avoiding that electro magnetic wave generated by signal transmission of the communication assembly 13 interferes with an airflow sensor 37 inside the battery assembly 12 which may cause false triggering of the electronic cigarette, when the communication assembly 13 is disposed in the end region of the battery assembly 12 for a long time. It can further avoid that tobacco tar leaked from the atomizer assembly 11 causes short circuit of the communication assembly 13 when the communication assembly 13 is disposed at an end of the battery assembly 12, which is connected to the atomizer assembly 11, for a long time.

According to an embodiment of the disclosure, a airflow channel is provided inside the atomizer assembly 11, the battery assembly 12 and the communication assembly 13. The airflow channel passing through the atomizer assembly 11, the battery assembly 12 and the communication assembly 13 is configured for air circulation when smoking, and the atomizer assembly 11, the communication assembly 13 and the battery assembly 12 are coaxially disposed, thereby ensuring that the airflow channel is unimpeded. An airflow sensor 37 and a control module 38 are disposed in the airflow channel inside the battery assembly 12.

The airflow sensor 37 is configured to sense pressure change in the airflow channel, and transmit smoking signal to the control module 38 according to the pressure change in the airflow channel in the battery assembly 12. The control module 38 is configured to control the battery assembly 12 to power the atomizer assembly 11 according to the smoking signal transmitted by the airflow sensor 37. A push-button control switch may also be disposed on the battery assembly 12, and the battery assembly 12 is controlled by the push-button control switch to power the atomizer assembly 11, which is not limited herein.

To make the purpose, features and merits of the disclosure more obvious and understandable, the technical solutions are clearly and completely described in the following in conjunction with drawings according to the embodiments of the disclosure. Apparently, the described embodiments are merely a few rather than all of the embodiments of the present disclosure. All other embodiments obtained by persons of ordinary skill in the art are based on the embodiments of the present disclosure without creative efforts shall fall within the protection scope of the present disclosure.

Figure 3:
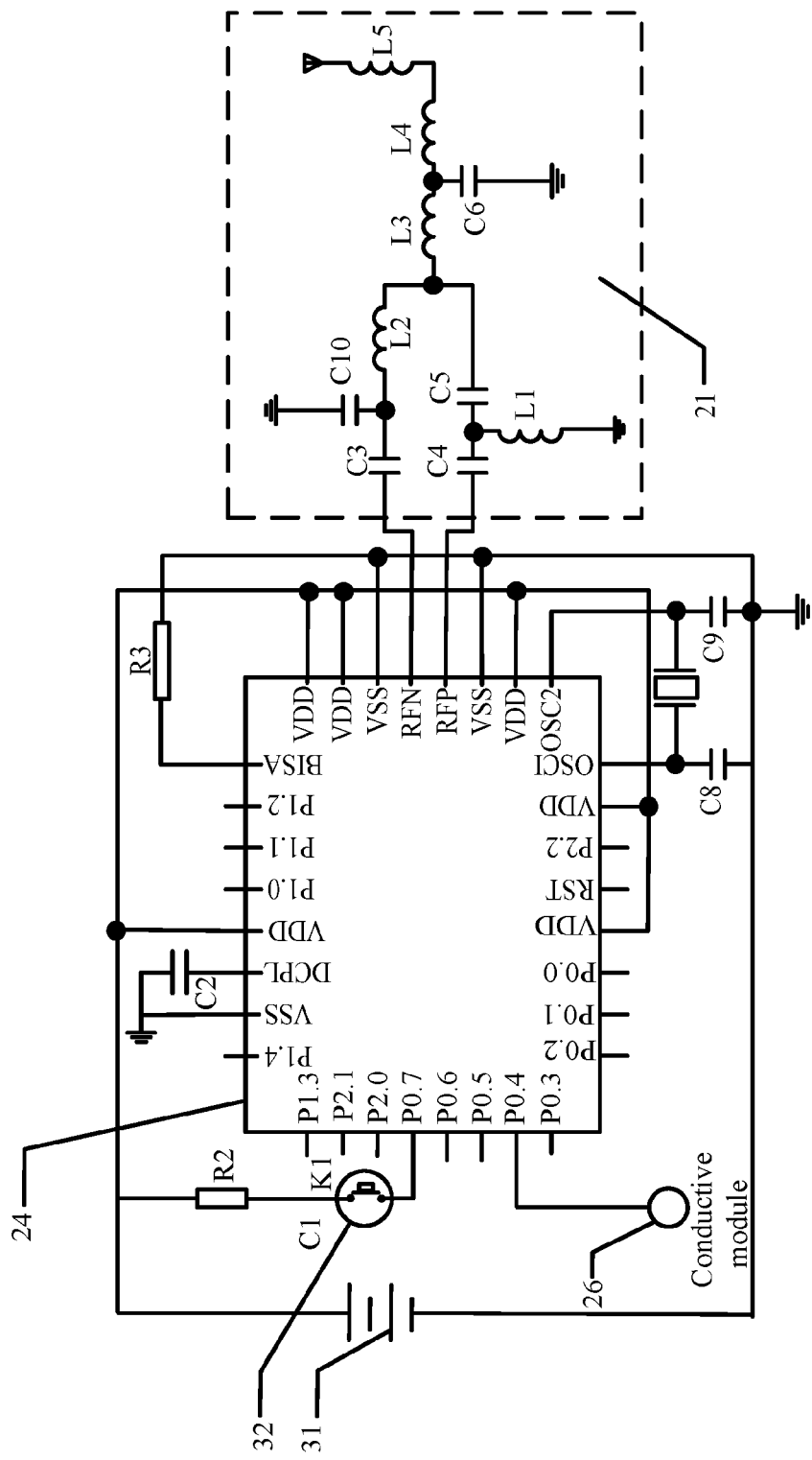
FIG. 3 is a circuit diagram of an electronic cigarette according to the first embodiment of the disclosure.

First embodiment will be described below with reference to FIG. 1 in conjunction with FIG. 2 and FIG. 3.

According to the embodiment, the microcontroller 24 is provided with a timing unit, a counting unit and a storage unit. The timing unit is configured to record smoking duration, and store the smoking duration into the storage unit. The counting unit is configured to record the number of times of a user smoking, and store the number into the storage unit.

Specifically, when the microcontroller 24 detects that the user is smoking, the timing unit starts to record smoking duration of the user, and the counting unit starts to record the number of puffs of the user or record the number of times of the user smoking during one day and transmit the recorded data to the storage unit.

According to the embodiment, the communication assembly 13 is provided with a power battery 31, and the power battery 31 is configured to power elements of the communication assembly 13.

When the battery assembly 12, the atomizer assembly 11 and the communication assembly 13 are connected, the battery assembly 12 is connected to the atomizer assembly 11 through the conductive module 26, and thus the battery assembly 12 may power the atomizer assembly 11. When the user puffs on the electronic cigarette, the battery assembly 12 supplies electric power to the atomizer assembly 11. At this time the microcontroller 24 detects that the conductive module 26 is at high level, and the timing unit of the microcontroller 24 starts timing, and records the smoking duration of the user. The counting unit starts recording the number of puffs of the user. Specific recorded content is not limited herein. When the user stops smoking, the microcontroller 24 transmits the smoking information of the user to the storage unit, and controls the wireless communication module 21 to transmit the smoking information to a connected terminal through the wireless communication module 21. Alternatively, the microcontroller 24 may also control the wireless communication module 21 to transmit the smoking information to the terminal through the wireless communication module 21 when a preset number of times of the user smoking or a preset time period for using the electronic cigarette, such as one day, one week or one month, is reached. The way of transmitting information and transmitting time are not limited herein.

According to the embodiment, network connection needs to be established before the wireless communication module 21 transmits data to the terminal. The wireless communication module 21 may be connected through WIFI or Bluetooth, etc. Specially, according to the embodiment, the wireless communication module 21 may search a network hotspot in a certain range, establish wireless network connection, and transmit information to a terminal device through the network hotspot. Alternatively, wireless network connection may be directly established between the wireless communication module 21 and a terminal device designated by the electronic cigarette. Specific used connection ways are not limited herein.

According to the embodiment, due to presence of the individual power battery 31, the power battery 31 may power the wireless communication module 21, thereby ensuring that the electronic cigarette is connected to the terminal. The microcontroller 24 may also perform the following control. When the user stops smoking, the microcontroller 24 senses that the conductive module 26 is at low level, so that the microcontroller 24 controls the power battery 31 to stop powering the wireless communication module 21, thereby may save electric energy of the power battery 31.

According to the embodiment, the communication assembly 13 is detachably connected to the battery assembly 12 and the atomizer assembly 11 respectively. Specially, the detachable connection may be threaded connection, snap-fit connection or magnet adhesion. According to the embodiment, the detachable connection is threaded connection.

According to the embodiment, the third connecting end of the battery assembly 12 is provided with a positive electrode connecting end 61 and a negative electrode connecting end 62.

The fourth connecting end of the atomizer assembly 11 is provided with an outer electrode 71 and an inner electrode 72, which are configured for power connection of the atomizer assembly 11.

The conductive module 26 is provided with a first conductive end 81 and a second conductive end 82 which are disposed at the first connecting end 121 and the second connecting end 111. The first conductive end 81 is electrically connected to the positive electrode connecting end 61 and the outer electrode 71 respectively, the second conductive end 82 is electrically connected to the negative electrode connecting end 62 and the inner electrode 72 respectively, so that the positive electrode connecting end 61 is electrically connected to the outer electrode 71 through the first conductive end 81, and the negative electrode connecting end 62 is electrically connected to the inner electrode 72 through the second conductive end 82, therefore the battery assembly 12 may power the atomizer assembly 11.

Specially, according to the embodiment, the communication assembly 13 is detachably connected to the battery assembly 12 and the atomizer assembly 11 respectively, where the detachable connection is threaded connection. The first connecting end 121 and the second connecting end 111 have threads adaptively connected to the battery assembly 12 and the atomizer assembly 11 respectively. The first conductive end 81 of the conductive module 26 may be integrated with the first connecting end 121 as a whole, i.e., the first connecting end 121 is made of conductive material. Alternatively conductive material of the first conductive end 81 may be individually disposed on the first connecting end 121. The second conductive end 82 of the conductive module 26 may be integrated with the second connecting end 111 as a whole, i.e., the second connecting end 111 is made of conductive material. Alternatively conductive material of the second conductive end 82 may be individually disposed on the second connecting end 111. According to the embodiment, the first conductive end 81 and the first connecting end 121 are integrated as a whole, and the second conductive end 82 and the second connecting end 111 are integrated as a whole, so that a closed loop is formed by connecting the atomizer assembly 11 to the second connecting end 111, and connecting the battery assembly 12 to the first connecting end 121, therefore the battery assembly 12 may power the atomizer assembly 11.

According to the embodiment, the communication assembly 13 is further provided with a switch module 32, configured to control to turn on or turn off the communication assembly 13, and control the communication assembly 13 to transmit information. For example, pressing the switch module 32 one time may turn on or turn off the communication assembly 13. In a case that frequency of pressing the switch module 32 in a preset period of time is greater than a preset number of times, the smoking information is transmitted. In this case, the user may control the communication assembly 13 through the switch module 32. The switch module 32 may be a button switch.

According to the embodiment, the electronic cigarette body is further provided with an oil storage assembly 14 connected to the atomizer assembly 11, where the oil storage assembly 14 is configured to store nicotine liquid.

According to the embodiment, the microcontroller 24 and the wireless communication module 21 may be integrated as a whole. A CC2543 chip, i.e., a 2.4 GHz radio wireless system-on-chip with a 32 Kb flash memory and 16 bus extenders may be used. The CC2543 chip supports iBeacon technology, i.e., a signal region may be automatically created by using bluetooth technology iBeacon with low power consumption. When a device enters into the region, a corresponding application may prompt the user whether to access the signal network. Through a small wireless sensor which may be disposed into any object and bluetooth technology with low power consumption, the user may use a smart device to transmit data. The electronic cigarette may perform communication with a terminal such as a cellphone, etc. And the electronic cigarette may transmit its unique ID by using the bluetooth technology with low power consumption. The terminal may receive the ID. Meanwhile, the wireless communication module 21 supports wireless communication function, i.e., the electronic cigarette may perform wireless communication with product of the same type nearby.

Figure 4:
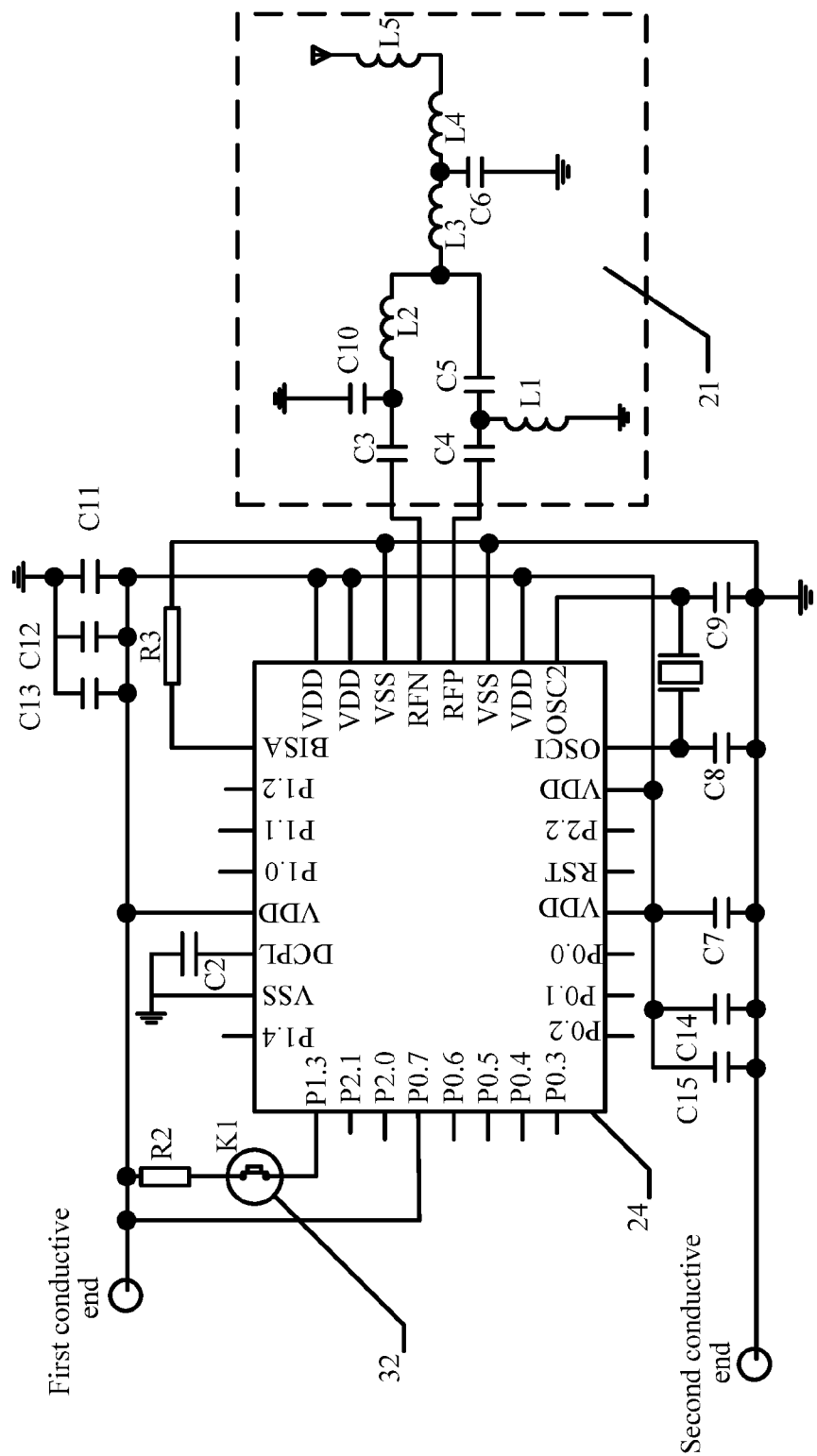
FIG. 4 is a circuit diagram of an electronic cigarette according to the second embodiment of the disclosure.

Second embodiment will be described below with reference to FIG. 4.

The electronic cigarette according to the second embodiment also has technical features of that according to the first embodiment, but the electronic cigarette according to the second embodiment has following difference to that according to the first embodiment.

When a user puffs on an electronic cigarette, the battery assembly 12 powers the atomizer assembly 11 through the conductive module 26 to atomize tobacco tar, while the battery assembly 12 powers elements of the communication assembly 13 through the conductive module 26.

The communication assembly 13 is further provided with an energy-storage capacitor module electrically connected to the conductive module 26. When the user puffs on the electronic cigarette, the battery assembly 12 powers the atomizer assembly 11 through the conductive module 26 to atomize tobacco tar, and meanwhile the battery assembly 12 charges the energy-storage capacitor through the conductive module 26. When the battery assembly 12 stops powering the communication assembly 13, the energy-storage capacitor module powers the elements of the communication assembly 13.

Specially, when the user puffs on the electronic cigarette, the battery assembly 12 powers the atomizer assembly 11. Since the first conductive end 81 and the first connecting end 121 are integrated as a whole and the second conductive end 82 and the second connecting end 111 are integrated as a whole, a closed loop is formed by connecting the atomizer assembly 11 to the second connecting end 111 and connecting battery assembly 12 to the first connecting end 121. Thus the battery assembly 12 may power the atomizer assembly 11. Meanwhile, according to the embodiment, the communication assembly 13 is also powered by the battery assembly 12, and charges the energy-storage capacitor module.

Once the communication assembly 13 is electrified, the counting unit of the microcontroller for the communication assembly 13 counts one time with the count being stored in the storage unit, and timing is started. The communication assembly 13 transmits some smoking data stored in the storage unit through the wireless communication module 21 to a terminal such as a cellphone, etc. The terminal analyzes and displays the data to the user. When the user stops smoking, i.e., when the battery assembly 12 stops powering the atomizer assembly 11, the communication assembly 13 according to the embodiment also powers off. When the microcontroller 24 of the communication assembly 13 detects that the conductive module 26 is at low level, i.e., when the communication assembly 13 powers off, the communication assembly 13 stops timing, and stores the timing result. At the moment, the communication assembly 13 is temporarily powered by the energy-storage capacitor module electrically connected to the conductive module 26. When the user smokes next time, the communication assembly 13 reads the stored data again, and transmits the data to the terminal.

According to the embodiment, the energy-storage capacitor module includes capacitors C7, C11, C12, C13, C14 and C15 in the circuit.

Figure 5:
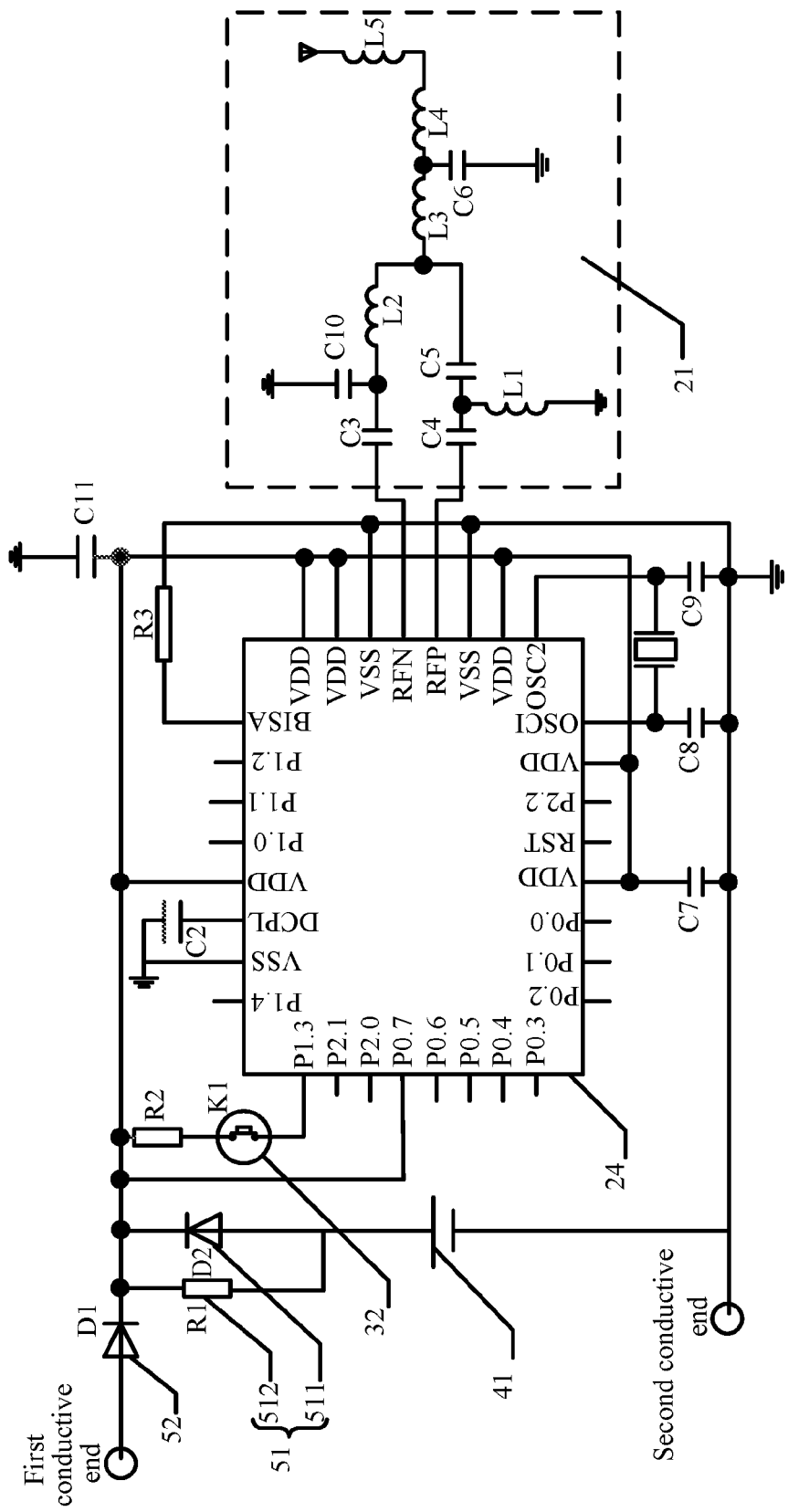
FIG. 5 is a circuit diagram of an electronic cigarette according to the third embodiment of the disclosure.

Third embodiment will be described below with reference to FIG. 5.

The electronic cigarette according to the third embodiment has technical features of those according to the first embodiment and the second embodiment, but the electronic cigarette according to the third embodiment has following difference to those according to the first embodiment and the second embodiment.

The communication assembly 13 is further provided with a rechargeable battery 41 electrically connected to the conductive module 26. When the user puffs on the electronic cigarette, the battery assembly 12 powers the atomizer assembly 11 through the conductive module 26 to atomize tobacco tar, and the battery assembly 12 also powers the rechargeable battery 41 through the conductive module 26. The rechargeable battery 41 is configured to power elements of the communication assembly 13 when the battery assembly 12 stops powering the elements of the communication assembly 13.

Specially, when the user puffs on the electronic cigarette, the battery assembly 12 is electrically connected to the conductive module 26 to power the elements of the communication assembly 13 and charge the rechargeable battery 41. When the user stop smoking, the battery assembly 12 is disconnected to the conductive module 26, and the rechargeable battery 41 powers the elements of the communication assembly 13.

According to the embodiment, cost of communication modules 13 is saved more relative to that of the first embodiment, and a small back-up battery may be used as the rechargeable battery 41, therefore volume of the communication assembly 13 is small. Operation of the communication assembly 13 is more stabilize relative to that according to the second embodiment, and the communication assembly 13 may operate when smoking is not performed.

According to the embodiment, the communication assembly 13 is further provided with a diode protection module 51 including a resistor 512 and a first diode 511. The resistor 512 is connected to the first diode 511 in parallel. The diode protection module 51 is connected to the positive electrode of the rechargeable battery 41. The first diode 511 is turned on to prevent reverse current from burning the rechargeable battery 41, when the rechargeable battery 41 powers the communication assembly 13. And when the battery assembly 12 powers the communication assembly 13, the rechargeable battery 41 is charged through the resistance 512.

According to the embodiment, the conductive module 26 is provided with a second diode 52. The second diode 52 is turned on to prevent reverse current from burning the battery assembly 12, when the battery assembly 12 powers the communication assembly 13.

Figure 6:
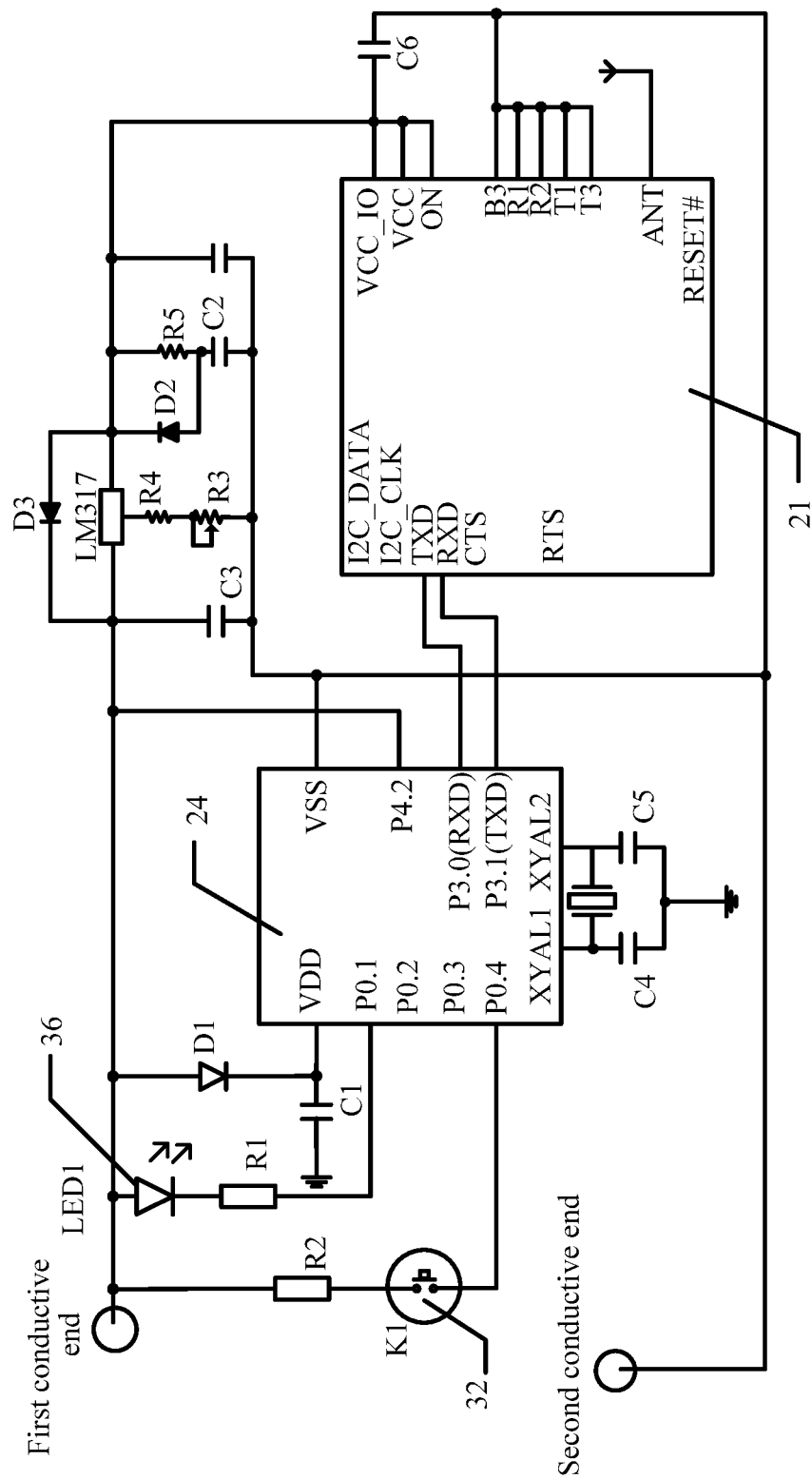
FIG. 6 is a circuit diagram of an electronic cigarette according to the fourth embodiment of the disclosure.

The fourth embodiment will be described below with reference to FIG. 6.

The communication module 13 according to the embodiment is powered by using any one of power supply modes according to the foregoing embodiments. The difference is that the wireless communication module 21 according to the embodiment includes a common bluetooth chip to realize wireless communication function.

Specially, a ROK101008 bluetooth communication chip available from Ericsson is used as the bluetooth chip according to the embodiment, and it is a wireless baseband module suitable for short range bluetooth communication which is launched by Ericsson. It has high degree of integration and low power consumption, and is suitable for bluetooth1.0B. The main control chip is a 8-bit processor AT89C51 available from Atmel, which is capable of collecting smoking signal. The two chips are connected communicably through serial ports.

According to the embodiment, traditional bluetooth function is used to communicate with terminals supporting bluetooth technology such as a cellphone and a computer, etc. As shown in FIG. 7, the LM317 circuit portion is a voltage regulation module configured to power the bluetooth chip.

The bluetooth technology according to the embodiment may also be used in the foregoing embodiments, and only the communication way of the wireless communication module 21 is different.

According to the embodiment, the communication assembly 13 is further provided with a display module 36 configured to display operation state of the communication assembly 13.

Specially, the display module 36 may include a LED lamp for displaying.

A system for collecting smoking information is further provided, including the electronic cigarette and the terminal according to the first embodiment to the fourth embodiment, where the electronic cigarette is configured to collect smoking information of the user and transmit the smoking information of the user to the terminal, and the terminal is configured to feed back the smoking information to the user.

The terminal may include a cellphone, a tablet computer or a desktop computer.

The embodiments of the present disclosure are described in a progressive manner and each embodiment places emphasis on the difference from other embodiments, therefore, one embodiment can refer to other embodiments for the same or similar parts.

According to the description of the disclosed embodiments, the disclosure may be implemented or used by the person skilled in the art. Various modifications made to these embodiments are apparent for persons skilled in the art, and a normal principle defined in the disclosure may be implemented in other embodiments without departing from spirit or scope of the disclosure. Therefore the disclosure is not limited to the embodiments described in the disclosure but confirms to a widest scope in accordance with principles and novel features disclosed in the disclosure.

What is claimed is:

1. An electronic cigarette, comprising:
   an electronic cigarette body, comprising an atomizer assembly configured to atomize nicotine liquid and a battery assembly configured to power elements of the electronic cigarette body; and
   a communication assembly between the atomizer assembly and the battery assembly, wherein the communication assembly is configured to communicate with an external terminal and comprises:
      a first connecting end detachably connected to the battery assembly;
      a second connecting end detachably connected to the atomizer assembly;
      a conductive module configured to connect the battery assembly to the atomizer assembly to power the atomizer assembly by the battery assembly;
      a microcontroller electrically connected to the conductive module, wherein the microcontroller is configured to record smoking information of the electronic cigarette according to an electrical signal of the conductive module and control operation of modules of the communication assembly; and
      a wireless communication module electrically connected to the microcontroller, wherein the wireless communication module is configured to establish communication connection with the external terminal to communicate data,
   wherein the atomizer assembly comprises a fourth connecting end detachably connected to the second connecting end, and the fourth connecting end of the atomizer assembly comprises an outer electrode and an inner electrode to provide power connection of the atomizer assembly, and
   wherein the conductive module comprises a first conductive end and a second conductive end at the second connecting end, the first conductive end is electrically connected to the outer electrode, and the second conductive end is electrically connected to the inner electrode.

2. The electronic cigarette according to claim 1, wherein:
   the battery assembly comprises a third connecting end detachably connected to the first connecting end, and
   the third connecting end is capable of being detachably connected to the fourth connecting end to form the electronic cigarette body.

3. The electronic cigarette according to claim 1, further comprising:
   a airflow channel passing through the atomizer assembly, the battery assembly and the communication assembly, wherein the airflow channel is configured to circulate air when smoking;
   an airflow sensor in the airflow channel inside the battery assembly; and a control module in the airflow channel inside the battery assembly, wherein the airflow sensor is configured to sense pressure change in the airflow channel, and transmit a smoking signal to the control module according to the pressure change in the airflow channel inside the battery assembly; and wherein the control module is configured to control the battery assembly to power the atomizer assembly according to the smoking signal transmitted by the airflow sensor.

4. The electronic cigarette according to claim 3, wherein the atomizer assembly, the communication assembly and the battery assembly are coaxially disposed.

5. The electronic cigarette according to claim 1, wherein the communication assembly further comprises another power battery configured to power the elements of the communication assembly.

6. The electronic cigarette according to claim 1, wherein the battery assembly powers the atomizer assembly through the conductive module to atomize tobacco tar and powers the elements of the communication assembly through the conductive module, when a user puffs on the electronic cigarette.

7. The electronic cigarette according to claim 6, wherein:
the communication assembly further comprises an energy-storage capacitor module electrically connected to the conductive module;
the battery assembly powers the atomizer assembly through the conductive module to atomize tobacco tar and powers the energy-storage capacitor module through the conductive module, when the user puffs on the electronic cigarette; and
the energy-storage capacitor module powers the elements of the communication assembly, when the battery assembly stops powering the communication assembly.

8. The electronic cigarette according to claim 6, wherein:
the communication assembly further comprises a rechargeable battery electrically connected to the conductive module;
the battery assembly powers the atomizer assembly through the conductive module to atomize tobacco tar and powers the rechargeable battery through the conductive module, when the user puffs on the electronic cigarette; and
the rechargeable battery powers the elements of the communication assembly, when the battery assembly stops powering the elements of the communication assembly.

9. The electronic cigarette according to claim 8, wherein:
the communication assembly further comprises a diode protection module between a positive electrode of the rechargeable battery and the conductive module;
the diode protection module comprises a resistor and a first diode, the resistor being connected to the first diode in parallel;
the diode protection module is electrically connected to the positive electrode of the battery;
the first diode is turned on to prevent reverse current from burning the rechargeable battery, when the rechargeable battery powers the communication assembly; and
the battery assembly charges the rechargeable battery through the resistor, when the battery assembly powers the communication assembly.

10. The electronic cigarette according to claim 1, wherein the microcontroller comprises:
a timing unit configured to record duration the user smokes and store the duration into a storage unit; and
a counting unit configured to record number of times the user smokes and store the number into the storage unit.

11. The electronic cigarette according to claim 2, wherein:
the third connecting end of the battery assembly comprises a positive electrode connecting end and a negative electrode connecting end;
the conductive module comprises a further first conductive end and a further second conductive end at the first connecting end;
the further first conductive end is electrically connected to the positive electrode connecting end;
the further second conductive end is electrically connected to the negative electrode connecting end; and
the positive electrode connecting end is connected to the outer electrode through the first conductive end, and the negative electrode connecting end is connected to the inner electrode through the second conductive end, therefore the battery assembly is capable to power the atomizer assembly.

12. The electronic cigarette according to claim 1, wherein the communication assembly further comprises a switch module configured to control to turn on or turn off the communication assembly.

13. The electronic cigarette according to claim 1, wherein the wireless communication module supports bluetooth or WIFI communication.

14. The electronic cigarette according to claim 1, wherein the communication assembly further comprises a display module configured to display operation status of the communication assembly.

15. The electronic cigarette according to claim 1, wherein the communication assembly is detachably connected to the battery assembly and the atomizer assembly respectively through threaded connection, snap-fit connection or magnet adhesion.

16. The electronic cigarette according to claim 1, wherein the electronic cigarette body further comprises an oil storage assembly connected to the atomizer assembly and the oil storage assembly is configured to store nicotine liquid.

17. A system for collecting smoking information, comprising the electronic cigarette according to claim 1 and a terminal, wherein:
the electronic cigarette is configured to collect smoking information of a user and transmit the smoking information to the terminal; and
the terminal is configured to feed back the smoking information to the user.

18. The system for collecting smoking information according to claim 17, wherein the terminal comprises a cellphone, a tablet computer or a desktop computer.

* * * * *